US009657746B2

(12) United States Patent
Urac

(10) Patent No.: US 9,657,746 B2
(45) Date of Patent: May 23, 2017

(54) COMPRESSOR ROTOR WITH ANTI-VORTEX FINS

(71) Applicant: PRATT & WHITNEY CANADA CORP., Longueuil (CA)

(72) Inventor: Tibor Urac, Mississauga (CA)

(73) Assignee: PRATT & WHITNEY CANADA CORP., Longueuil, QC (CA)

(*) Notice: Subject to any disclaimer, the term of this patent is extended or adjusted under 35 U.S.C. 154(b) by 340 days.

(21) Appl. No.: 14/472,958

(22) Filed: Aug. 29, 2014

(65) Prior Publication Data

US 2016/0061215 A1 Mar. 3, 2016

(51) Int. Cl.
*F04D 29/32* (2006.01)
*F04D 29/28* (2006.01)
*F01D 5/04* (2006.01)
*F02C 6/08* (2006.01)

(52) U.S. Cl.
CPC .......... *F04D 29/321* (2013.01); *F01D 5/045* (2013.01); *F01D 5/046* (2013.01); *F02C 6/08* (2013.01); *F04D 29/284* (2013.01)

(58) Field of Classification Search
CPC .... F04D 29/321; F04D 29/284; F04D 29/324; F04D 29/329; F01D 5/03; F01D 5/022
USPC .......... 60/782, 785, 269, 806; 415/115, 144, 415/175, 77, 208.2; 416/189, 189 R, 203
See application file for complete search history.

(56) References Cited

U.S. PATENT DOCUMENTS

| 2,618,433 A | * | 11/1952 | Loos | ....................... F01D 5/081 384/100 |
| 2,641,440 A | * | 6/1953 | Williams | ................ F01D 5/087 228/140 |
| 4,231,704 A | * | 11/1980 | Ayache | ..................... F01D 5/08 416/198 A |
| 4,919,590 A | * | 4/1990 | Stratford | ............... F04D 29/321 415/116 |
| 6,361,277 B1 | * | 3/2002 | Bulman | .................. F01D 5/082 416/198 A |
| 7,624,580 B2 | * | 12/2009 | Fukutani | ................. F01D 5/082 60/39.08 |
| 7,828,514 B2 | | 11/2010 | Kutz | |

(Continued)

FOREIGN PATENT DOCUMENTS

EP 2644827 A2 * 10/2013 ............ F01D 5/087

*Primary Examiner* — Marina Tietjen
(74) *Attorney, Agent, or Firm* — Norton Rose Fulbright Canada LLP

(57) ABSTRACT

A compressor rotor of a gas turbine engine includes a rotor body having a face adapted to face an adjacent rotor. The rotor body extends radially between an outer peripheral rim surface and an inner rim surface. The inner rim surface defines a bore of the rotor body. A plurality of blades extends radially from the outer peripheral rim surface. A plurality of anti-vortex fins extends axially from the face of the rotor body facing the adjacent rotor. The plurality of anti-vortex fins forms a plurality of open radial passageways. The plurality of anti-vortex fins extends axially to a predetermined thickness such that, when assembled with the second rotor, axial extremities of the plurality of anti-vortex fins being in close proximity with the adjacent rotor and the adjacent rotor closes the radial passageways. A method of providing a first rotor for assembly with a second facing rotor of a compressor rotor assembly is also presented.

16 Claims, 4 Drawing Sheets

(56) References Cited

U.S. PATENT DOCUMENTS

| | | | |
|---|---|---|---|
| 8,348,599 B2* | 1/2013 | Chiu | F04D 29/321 |
| | | | 415/115 |
| 8,453,463 B2 | 6/2013 | Grewal et al. | |
| 8,556,584 B2* | 10/2013 | Mallaiah | F01D 5/03 |
| | | | 416/185 |
| 9,121,413 B2* | 9/2015 | Roush | F04D 29/321 |
| 2009/0180885 A1* | 7/2009 | Rajarajan | B23P 6/002 |
| | | | 416/204 A |
| 2011/0123325 A1* | 5/2011 | Morris | F01D 5/085 |
| | | | 415/208.1 |
| 2012/0020779 A1* | 1/2012 | Hollman | F04D 29/441 |
| | | | 415/208.2 |
| 2012/0027606 A1 | 2/2012 | Malmborg | |
| 2013/0343868 A1* | 12/2013 | Jha | F01D 5/087 |
| | | | 415/1 |

\* cited by examiner

COMPRESSOR ROTOR WITH ANTI-VORTEX FINS

TECHNICAL FIELD

The present application relates to gas turbine engines and, more particularly, to anti-vortex structures in a compressor.

BACKGROUND OF THE ART

Conventional compressor bleed arrangements typically consist of a relatively complex assembly of parts, such as discs, plates, sheet metal guide vanes, conical members, shafts and rotors. All these parts are cumbersome and add to the overall weight and cost of the engine. Space limitations as well as the needs for not disrupting the airflow in the main gas path of the engine also render the installation of multi-parts bleeding arrangement challenging. Multi-part assemblies also suffer from non-negligible pressure drops notably at the joints between differently oriented parts. They may also affect the balance of the compressor rotor when mounted thereto.

SUMMARY

In one aspect, there is provided a compressor rotor of a gas turbine engine, the compressor rotor comprising: a rotor body having a face adapted to face an adjacent rotor, the rotor body extending radially between an outer peripheral rim surface and an inner rim surface, the inner rim surface defining a bore of the rotor body; a plurality of blades extending radially from the outer peripheral rim surface; and a plurality of anti-vortex fins extending axially from the face of the rotor body facing the adjacent rotor, the plurality of anti-vortex fins forming a plurality of open radial passageways, the plurality of anti-vortex fins extending axially to a predetermined thickness such that, when assembled with the second rotor, axial extremities of the plurality of anti-vortex fins being in close proximity with the adjacent rotor and the adjacent rotor closes the radial passageways.

In another aspect, there is provided a compressor rotor assembly of gas turbine engine, the compressor rotor assembly comprising: first and second adjacent rotors, the first rotor including: a rotor body, the rotor body having axially opposed faces, the rotor body extending radially between an outer peripheral rim surface and an inner rim surface, the inner rim surface defining a bore of the body; a plurality of blades extending radially from the outer peripheral rim surface; a plurality of anti-vortex fins extending axially from the face of the first rotor facing the second rotor, the plurality of anti-vortex fins forming a plurality of radial passageways closed by the second rotor so that the radial passageways are fluidly independent from each other.

In a further aspect, there is provided a method of providing a first rotor for assembly with a second facing rotor of a compressor rotor assembly, the method comprising: i) forming a plurality of anti-vortex fins extending axially from a face of the first rotor at a predetermined thickness such that, when assembled with the second rotor, axial extremities of the plurality of anti-vortex fins are in close proximity with the second rotor and the plurality of anti-vortex fins define between the first rotor and the second rotor a plurality of fluidly independent radial passageways.

DESCRIPTION OF THE DRAWINGS

Reference is now made to the accompanying figures in which.

DETAILED DESCRIPTION

Figure 1:
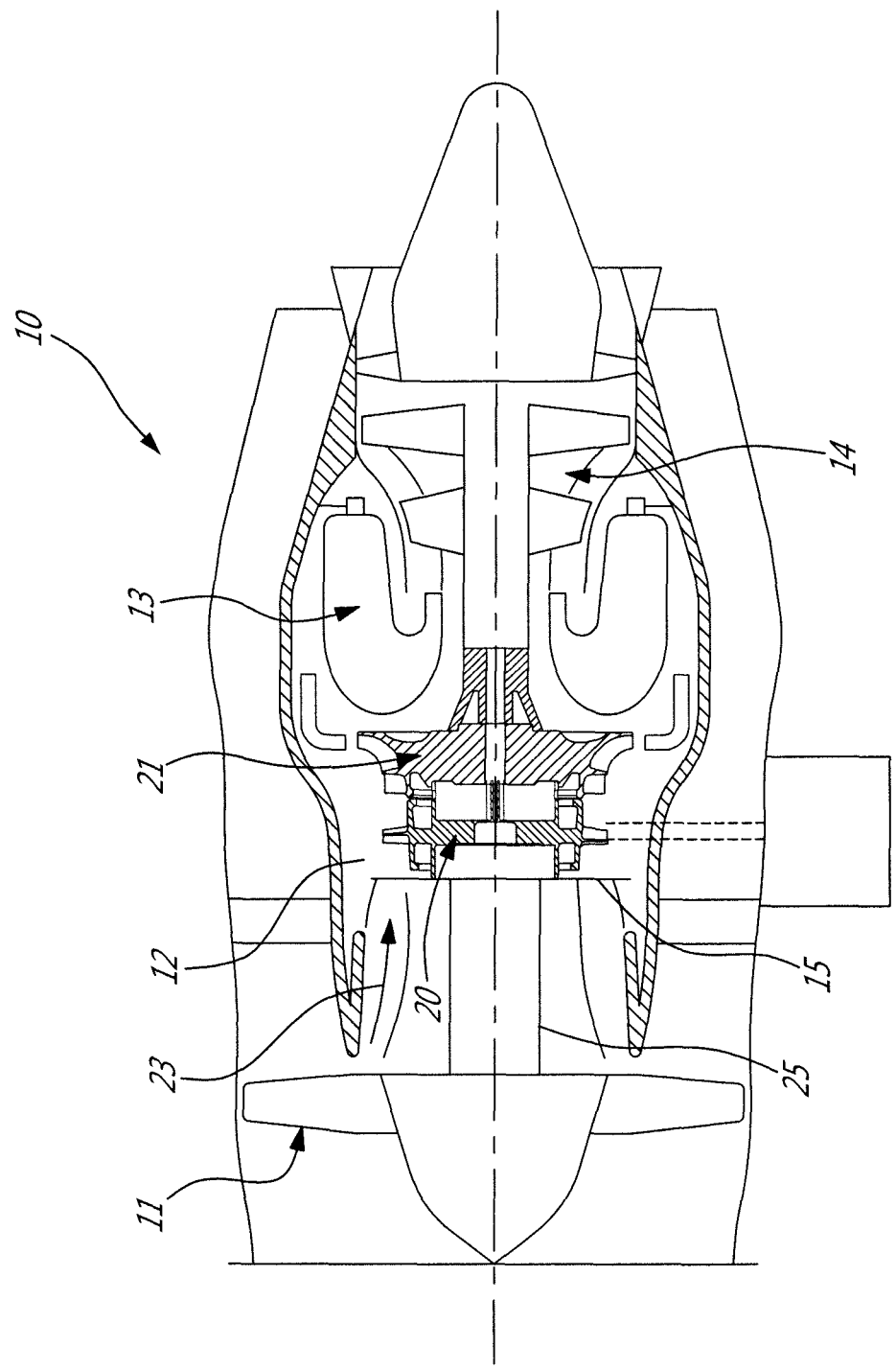
FIG. 1 is a schematic cross-sectional view of a gas turbine engine.

FIG. 1 illustrates a gas turbine engine 10 of a type preferably provided for use in subsonic flight, generally comprising in serial flow communication a fan 11 through which ambient air is propelled, a multistage compressor 12 for pressurizing the air, a combustor 13 in which the compressed air is mixed with fuel and ignited for generating an annular stream of hot combustion gases, and a turbine section 14 for extracting energy from the combustion gases. The multi-stage compressor 12 is herein shown in simplified view but comprises among others a low pressure compressor rotor 15 followed by an assembly of high pressure rotors including a first axial compressor rotor 20 and an impeller 21.

Figure 2:
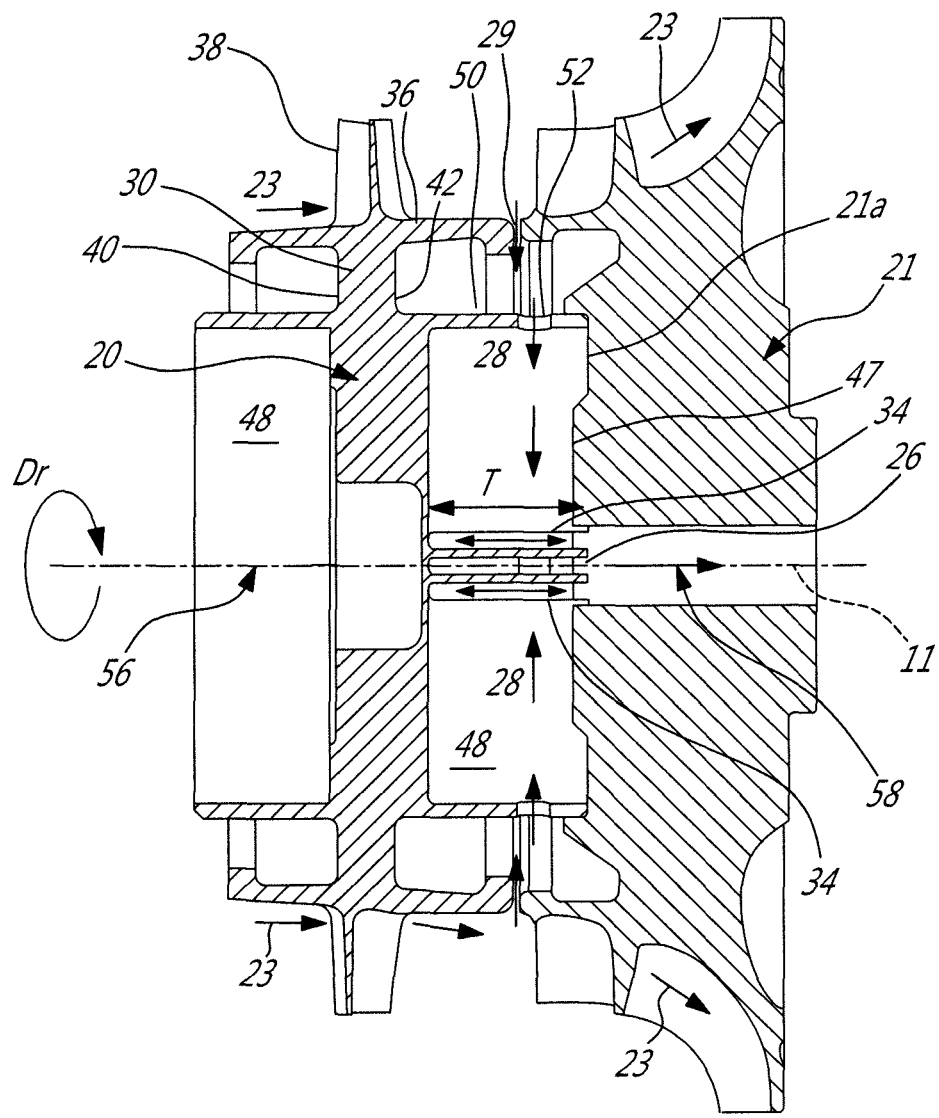
FIG. 2 is a schematic cross-sectional view of a high pressure rotor assembly of the gas turbine of FIG. 1.

With reference to FIG. 2, the impeller 21 is disposed downstream of the rotor 20 relative to a flow of air flowing through a gas path 23. The compressor rotor 20 is supported by a high pressure engine shaft 25 (shown in FIG. 1). The high pressure shaft 25 rotates with the compressor rotor 20 in a direction of rotation Dr. The high pressure engine shaft 25 includes a central passage 26 which communicates with the gas path 23. The compressor rotor 20 is designed to channel bleed air 28 which escapes from the gas path 23 via clearance 29 between the compressor rotor 20 and the impeller 21, toward the central passage 26. Bleed air 28 may be used to cool components of the turbine section 14 or to feed bearing cavities.

Figure 3:
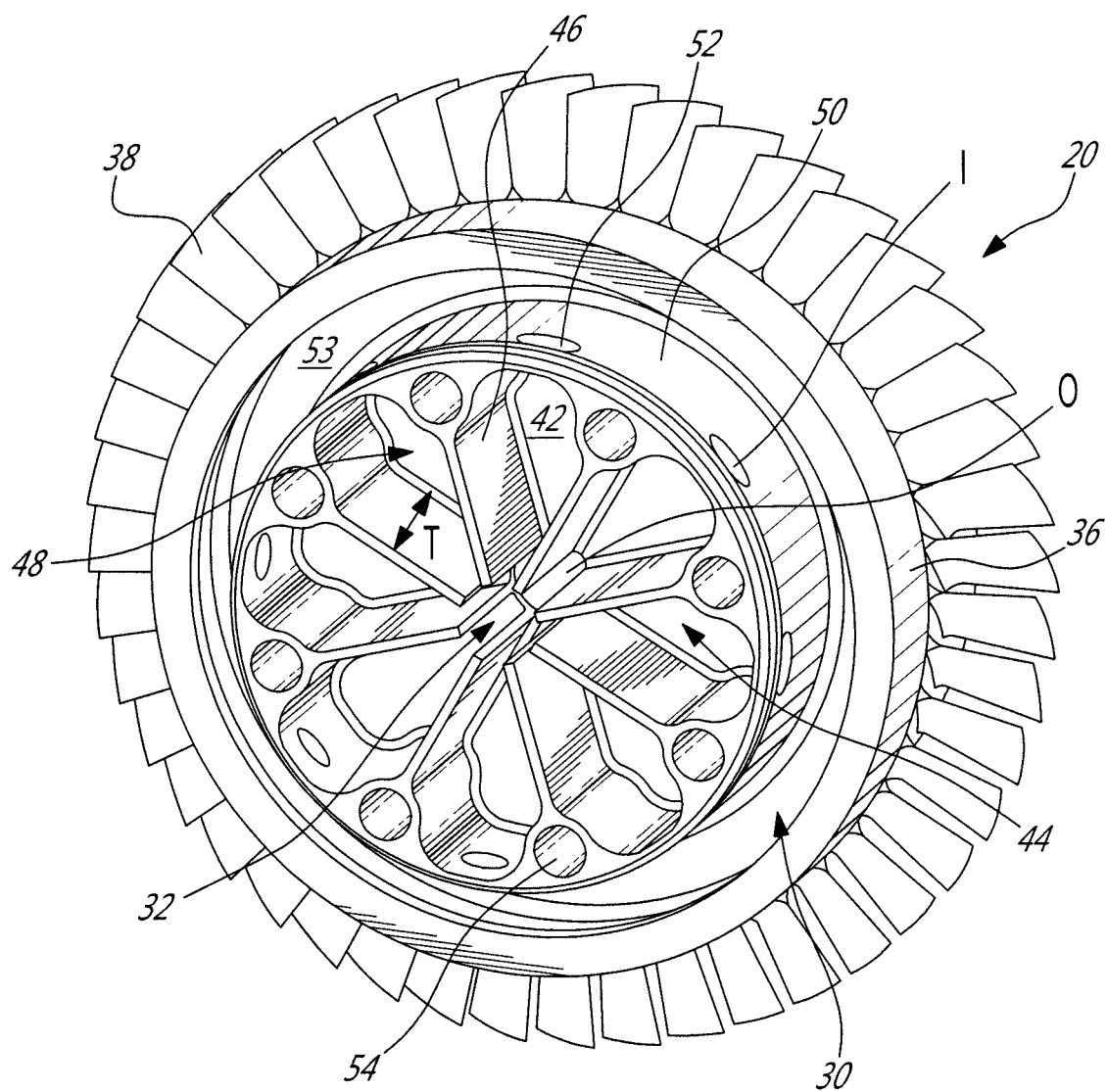
FIG. 3 is a schematic isometric view of a high pressure rotor of the high pressure rotor assembly of FIG. 2 according to a first embodiment.

With additional reference to FIG. 3, a first embodiment of the compressor rotor 20 will be described. The compressor rotor 20 includes a generally circular rotor body 30 and a central bore 32. The central bore 32 defines an inner peripheral rim surface 34. The rotor body 30 also includes an outer peripheral rim surface 36 from which a plurality of blades 38 extend radially. The rotor body 30 defines two opposed faces 40, 42. The face 42 faces the impeller 21 and includes a plurality of channelling structures 44 for channeling the bleed air 28 to the central passage 26.

The plurality of channelling structures 44 includes a plurality of circumferentially distributed anti-vortex fins 46 extending axially from the face 42 and radially from the central bore 32. The anti-vortex fins 46 may be integrally formed on the face 42 using various manufacturing techniques. For example, the anti-vortex fins 46 could be milled with a large cutter. The formation of the anti-vortex fins 46 could be integrated to the compressor rotor 20's forging operation.

The anti-vortex fins 46 define a plurality of radial open passageways 48 which are closed by the presence of the impeller 21. The passageways 48 are fluidly independent from one another (i.e. the passageways 48 are closed or almost closed channels and do not or almost not communicate with each other). Because the anti-vortex fins 46 have a predetermined thickness T such that axial extremities 47 of the fins 46 are in close proximity with a face 21a of the impeller 21, the bleed air 28 is channeled in the individual passageways 48 without interacting or with little interaction with the other passageways 48. The independence of the passageways 48 may prevent vortex or swirling formation which in turn may reduce pressure drop in the bleed air 28.

In one embodiment, the anti-vortex fins 46 extend from the central bore 32 to an intermediate rim surface 50. The intermediate rim surface 50 extends axially from the face 42 and is disposed radially between the inner rim surface 34 and the outer peripheral rim surface 36. The intermediate rim surface 50 includes a plurality of circumferentially distributed openings 52 generally radially aligned with the clearance 29. The openings 52 communicate the bleed air 28 to the individual passageways 48 and represent inlets I of the passageways 48. The openings 52 may be sized to allow a desired amount of bleed air 28 without depleting the gas path 23 to an unacceptable level. In the embodiment shown in FIG. 3, the openings 52 are windows in the intermediate peripheral rim surface 50. It is however contemplated that the openings 52 could be cut-outs. One opening 52 may be associated with a unique one of the passageways 48. It is however contemplated that each passageway 48 could have more than one opening 52 associated to it.

The anti-vortex fins 46 connect directly with the central bore 32 so that ends of the anti-vortex fins 46 at the central bore 32 represent outlets O of the passageways 48. While the embodiment shown in the figures shows that the anti-vortex fins 46 are extending directly from the central bore 32, it is contemplated that the anti-vortex fins 46 could extend from a location close to the central bore 32. It is also contemplated that an additional intermediate peripheral rim surface disposed at proximity with the central bore 32 could have a plurality of openings defining the outlets of the passageways 48. It is also contemplated that a cavity 53 defined between the face 42, the impeller 21, the outer peripheral rim surface 36 and the intermediate peripheral rim surface 50 could include a plurality of fins or other channelling structures. While the anti-vortex fins 46 shown in the Figures provide uniformly circumferentially spaced-apart passageways 48, it is contemplated that the passageways 48 could be spaced unevenly along a circumference of the rotor body 30.

The plurality of channelling structures 44 shown herein forms tapering passageways 48 toward the central bore 32. The tapering may favor pressure in the bleed air 28 by providing converging channels toward the outlets. It is however contemplated that the passageways 48 could not be tapered toward the central bore 32.

Tie-rods openings 54 are located at a connection between the anti-vortex fins 46 and the intermediate rim surface 50. The tie rods openings 54 receive each a corresponding tie-rod (not shown) that runs through the rotors to clamp the rotor discs altogether. It is contemplated that the tie-rods openings 54 could be located elsewhere on the rotor body 30.

While the plurality of channelling structures 44 is being shown to be formed onto the face 42 of the rotor 20, it is contemplated that the channelling structures 44 could instead be formed on the face 21a of the impeller 21 facing the rotor 20.

When the compressor rotor 20 rotates, bleed air 28 is being drawn from the gas path 23 through the clearance 29 between the compressor rotor 20 and the impeller 21. The clearance 29 runs circularly and air is being drawn radially therethrough. Passed the clearance the bleed air 28 is contained in the cavity 53 between the outer peripheral rim surface 36 and the intermediate rim surface 50. From there, the bleed air 28 enters the passageways 48 through their corresponding openings 52. At that point, the bleed air 28 is segmented into a plurality of channel flows. The segmentation may avoid formation of vortices between the compressor rotor 20 and the impeller 21. The bleed air 28 is drawn in the passageways 48 from the openings 52 (i.e. inlets) to the central bore 32 (i.e. outlets). Once reaching the central bore 32, the bleed air 28 may travel in opposite directions, either upstream (see arrow 56 in FIG. 2) toward, for example, a seal or downstream (see arrow 58 in FIG. 2) through the shaft supporting the rotors toward, for example, the turbine section 14.

Figure 4:
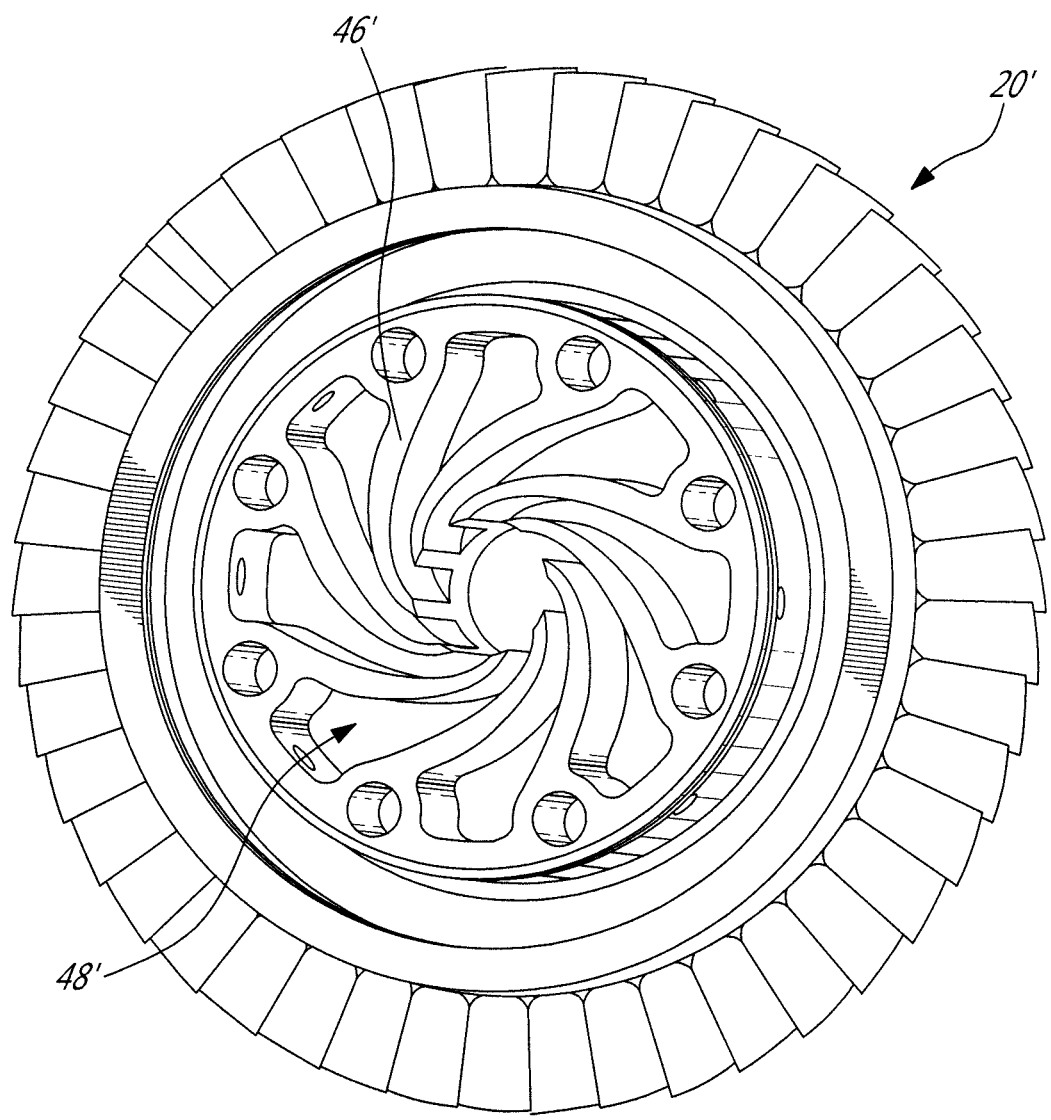
FIG. 4 is a schematic isometric view of a high pressure rotor of the high pressure rotor assembly of FIG. 2 according to a second embodiment.

Turning now to FIG. 4, a second embodiment of the compressor rotor 20' will be described. Features of the compressor rotor 20' common to the compressor rotor 20 will not be described in details again and will bear same reference numeral but with a prime. The compressor rotor 20' includes a plurality of anti-vortex fins 46' similar to the anti-vortex fins 46 except that they are curved. The anti-vortex fins 46' may be curved in the direction of rotation Dr so as to form a plurality of fluidly independent curved passageways 48'. The curved passageways 48' may have a curvature determined to further increase pressure in the bleed air 28 by taking advantage of the rotation of the compressor rotor 20. The curved passageways 48' may be tapered from the inlets to the outlets.

The above described compressor rotors may reduce weight, cost and complexity associated with separate anti-vortex rings. Integrating anti-vortex fins to the compressor rotor may allow different designs of the fins, including curved fins, which may further reduce pressure loss in the bleed air.

The above description is meant to be exemplary only, and one skilled in the art will recognize that changes may be made to the embodiments described without departing from the scope of the invention disclosed. Other modifications which fall within the scope of the present invention will be apparent to those skilled in the art, in light of a review of this disclosure, and such modifications are intended to fall within the appended claims.

The invention claimed is:

1. A compressor rotor of a gas turbine engine, the compressor rotor comprising:
   a rotor body having a face adapted to face an adjacent rotor, the rotor body extending radially between an outer peripheral rim surface and an inner rim surface, the inner rim surface defining a bore of the rotor body;
   a plurality of blades extending radially outwardly from the outer peripheral rim surface;
   a plurality of anti-vortex fins extending axially from the face of the rotor body facing the adjacent rotor, the plurality of anti-vortex fins forming a plurality of open radial passageways, the plurality of anti-vortex fins extending axially to a predetermined thickness such that, when assembled with the second rotor, axial extremities of the plurality of anti-vortex fins being in close proximity with the adjacent rotor and the adjacent rotor axially closes the radial passageways; and
   an intermediate rim surface disposed on the face facing the adjacent rotor, the intermediate rim surface being disposed between the outer peripheral rim surface and the inner rim surface and connecting the plurality of anti-vortex fins, the intermediate rim surface defining a plurality of inlets connected in flow communication with respective ones of the plurality of radial passageways, the inlets receiving bleed air and directing it radially inwardly to the associated radial passageways.

2. The compressor rotor of claim 1, wherein the plurality of radial passageways extends to the inner rim surface.

3. The compressor rotor of claim 1, wherein the radial passageways are disposed circumferentially spaced-apart.

4. The compressor rotor of claim 1, wherein the radial passageways are curved in a direction of rotation of the compressor rotor.

5. The compressor rotor of claim 1, wherein the anti-vortex fins are integral to the rotor body.

6. The compressor rotor of claim 1, wherein the radial passageways are tapered toward the inner peripheral rim surface.

7. A compressor rotor assembly of gas turbine engine, the compressor rotor assembly comprising:
first and second adjacent rotors, the first rotor including:
a rotor body, the rotor body having axially opposed first and second faces, the first face facing the second rotor, the rotor body extending radially between an outer peripheral rim surface and an inner rim surface, the inner rim surface defining a bore of the body;
a plurality of blades extending radially outwardly from the outer peripheral rim surface;
a plurality of anti-vortex fins extending axially from the first face of the first rotor, the plurality of anti-vortex fins forming a plurality of radial passageways closed by the second rotor so that the radial passageways are fluidly independent from each other; and
an intermediate rim surface disposed on the first face of the first rotor, the intermediate rim surface being disposed toward the outer rim surface and connecting the plurality of anti-vortex fins, the intermediate rim surface including a plurality of inlets connected in fluid flow communication to respective ones of the radial passageways.

8. The gas turbine engine of claim 7, wherein the plurality of radial passageways extends to the inner rim surface.

9. The gas turbine engine of claim 7, wherein the radial passageways are disposed circumferentially spaced-apart.

10. The gas turbine engine of claim 7, wherein the radial passageways are curved in a direction of rotation of the rotor.

11. The gas turbine engine of claim 7, wherein the second rotor is an impeller.

12. The gas turbine engine of claim 6, wherein the radial passageways are tapered toward the inner rim surface.

13. A method of providing a first rotor for assembly with a second facing rotor of a compressor rotor assembly, the method comprising:
i) forming a plurality of anti-vortex fins extending axially from a face of the first rotor at a predetermined thickness such that, when assembled with the second rotor, axial extremities of the plurality of anti-vortex fins are in close proximity with the second rotor and the plurality of anti-vortex fins define between the first rotor and the second rotor a plurality of fluidly independent radial passageways; and
ii) forming an intermediate rim surface on the first rotor, the intermediate rim surface connecting the plurality of anti-vortex fins, the intermediate rim surface including a plurality of inlets in a one-to-one relationship with the plurality of radial passageways.

14. The method of claim 13, wherein forming the plurality of anti-vortex fins comprises forming curved anti-vortex fins so that the plurality of curved anti-vortex fins define between the first rotor and the second rotor a plurality of fluidly independent curved radial passageways.

15. The method of claim 13, wherein forming the plurality of anti-vortex fins comprises forming tapered anti-vortex fins so that the plurality of anti-vortex fins define between the first rotor and the second rotor a plurality of fluidly independent tapered radial passageways toward a center bore of the first rotor.

16. The method of claim 13, wherein forming the plurality of anti-vortex fins comprises milling with a cutter the plurality of curved anti-vortex fins from the face of the first rotor.

* * * * *